United States Patent
Kuwashiro

(10) Patent No.: US 8,599,493 B2
(45) Date of Patent: Dec. 3, 2013

(54) ZOOM LENS AND IMAGE PICKUP APPARATUS INCLUDING THE SAME

(75) Inventor: Shin Kuwashiro, Utsunomiya (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 13/365,035

(22) Filed: Feb. 2, 2012

(65) Prior Publication Data

US 2012/0200745 A1 Aug. 9, 2012

(30) Foreign Application Priority Data

Feb. 7, 2011 (JP) ................................. 2011-023701

(51) Int. Cl.
*G02B 15/14* (2006.01)

(52) U.S. Cl.
USPC .......................................... 359/687; 359/676

(58) Field of Classification Search
USPC ........ 359/676, 671, 686, 682, 687; 348/240.3
See application file for complete search history.

(56) References Cited

U.S. PATENT DOCUMENTS

| | | | |
|---|---|---|---|
| 7,463,427 B2 | 12/2008 | Nanjo | |
| 7,760,440 B2 | 7/2010 | Kawada | |
| 2006/0227429 A1* | 10/2006 | Miyazawa | 359/686 |
| 2007/0273980 A1* | 11/2007 | Horiuchi | 359/687 |
| 2009/0086321 A1* | 4/2009 | Mizuguchi et al. | 359/557 |

* cited by examiner

*Primary Examiner* — Scott J Sugarman
*Assistant Examiner* — Mustak Choudhury
(74) *Attorney, Agent, or Firm* — Canon USA Inc. IP Division

(57) ABSTRACT

A zoom lens includes a first lens unit having a positive refractive power, a second lens unit having a negative refractive power and configured to move during a zooming operation, a third lens unit having a positive refractive power, and a fourth lens unit having a positive refractive power and configured to move during a zooming operation. The first lens unit has a negative lens closest to an object side, and includes at least five lenses.

10 Claims, 17 Drawing Sheets

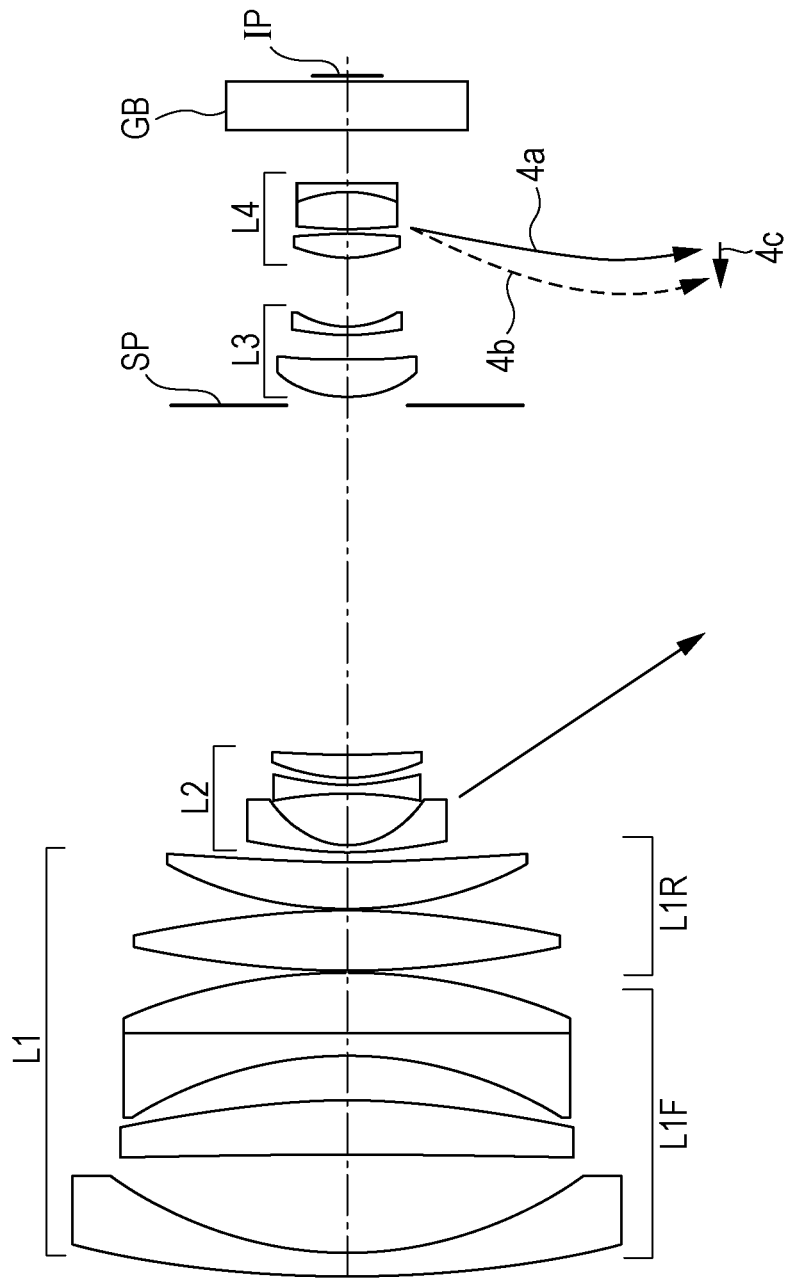

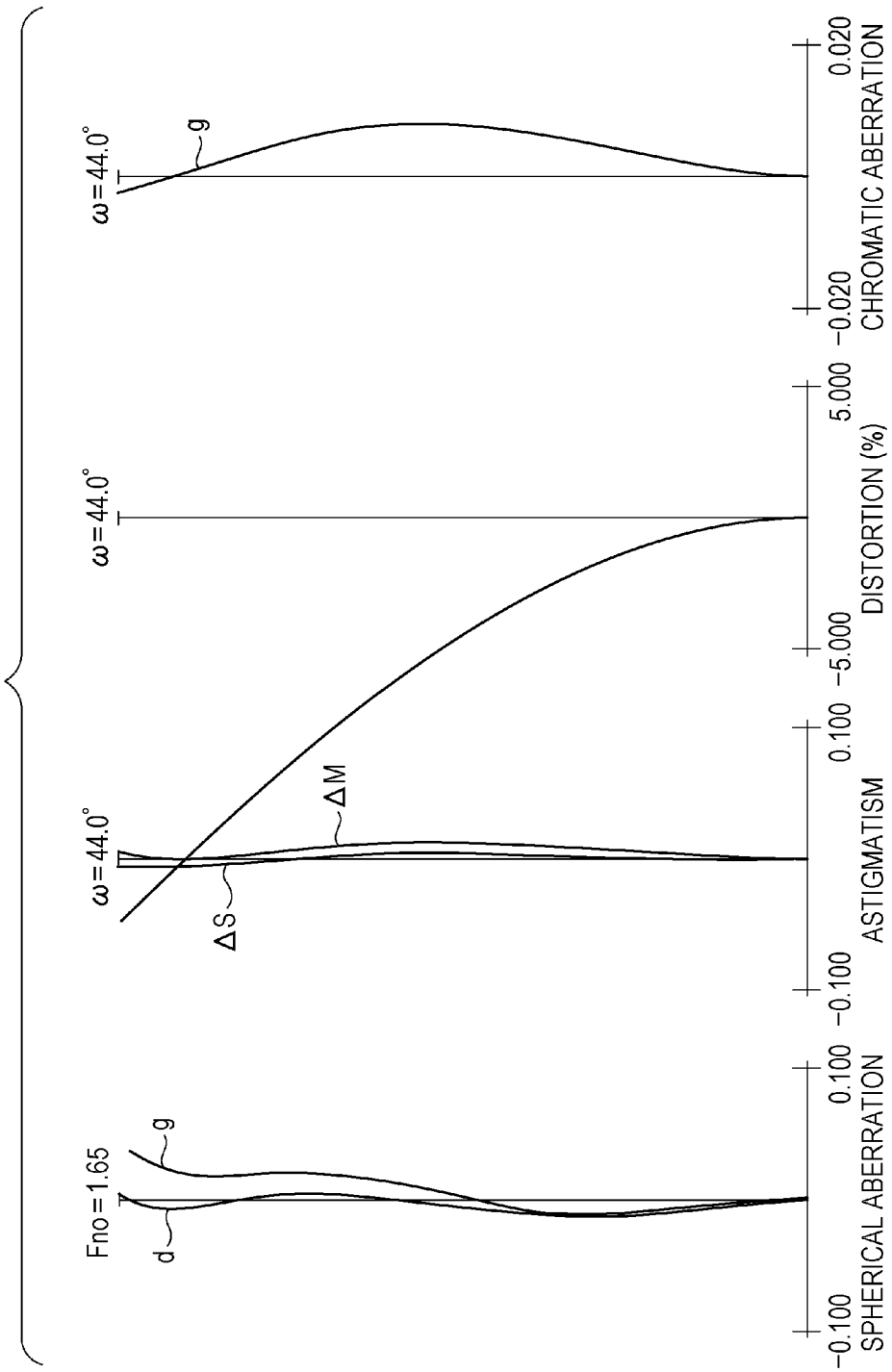

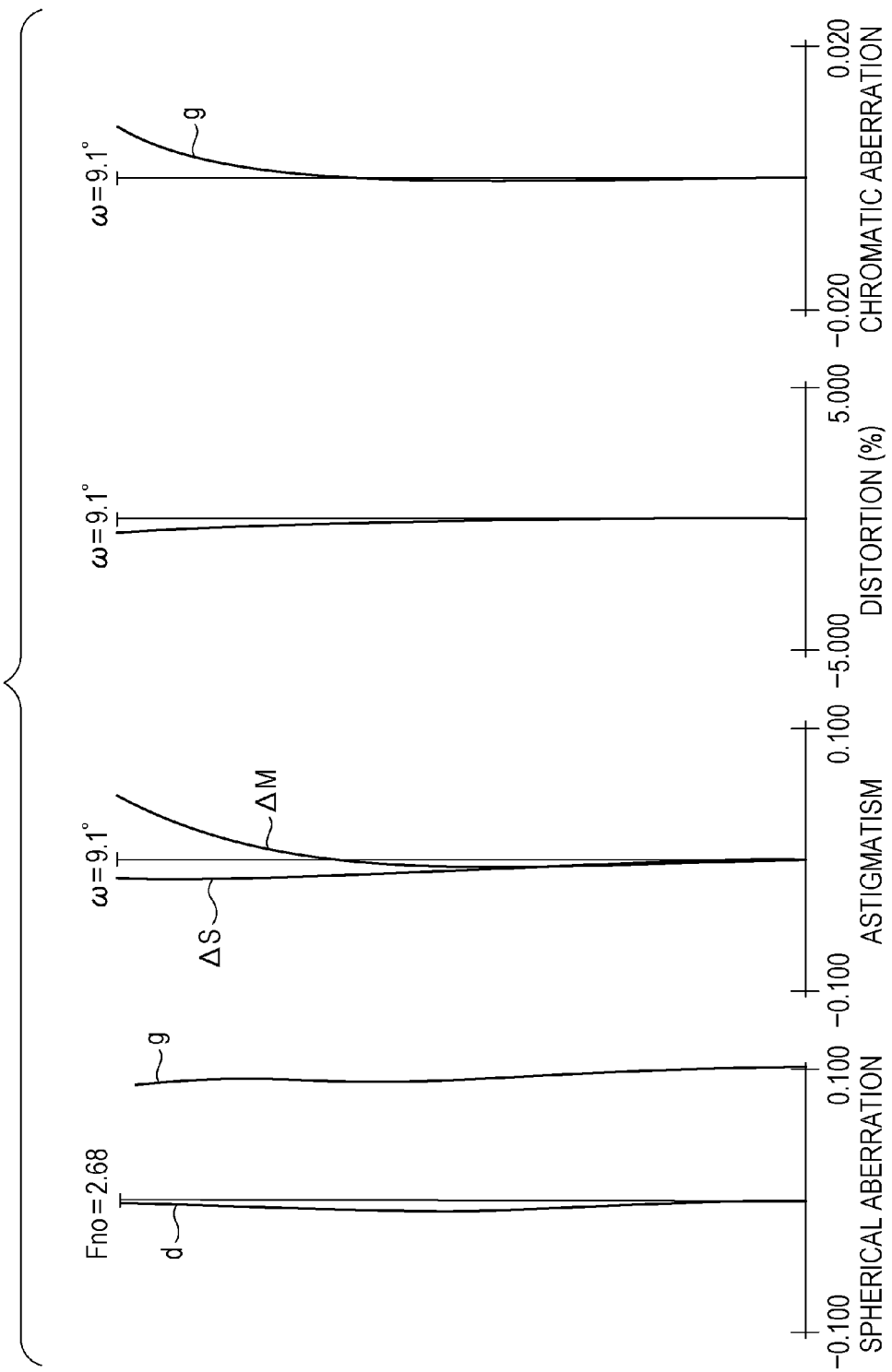

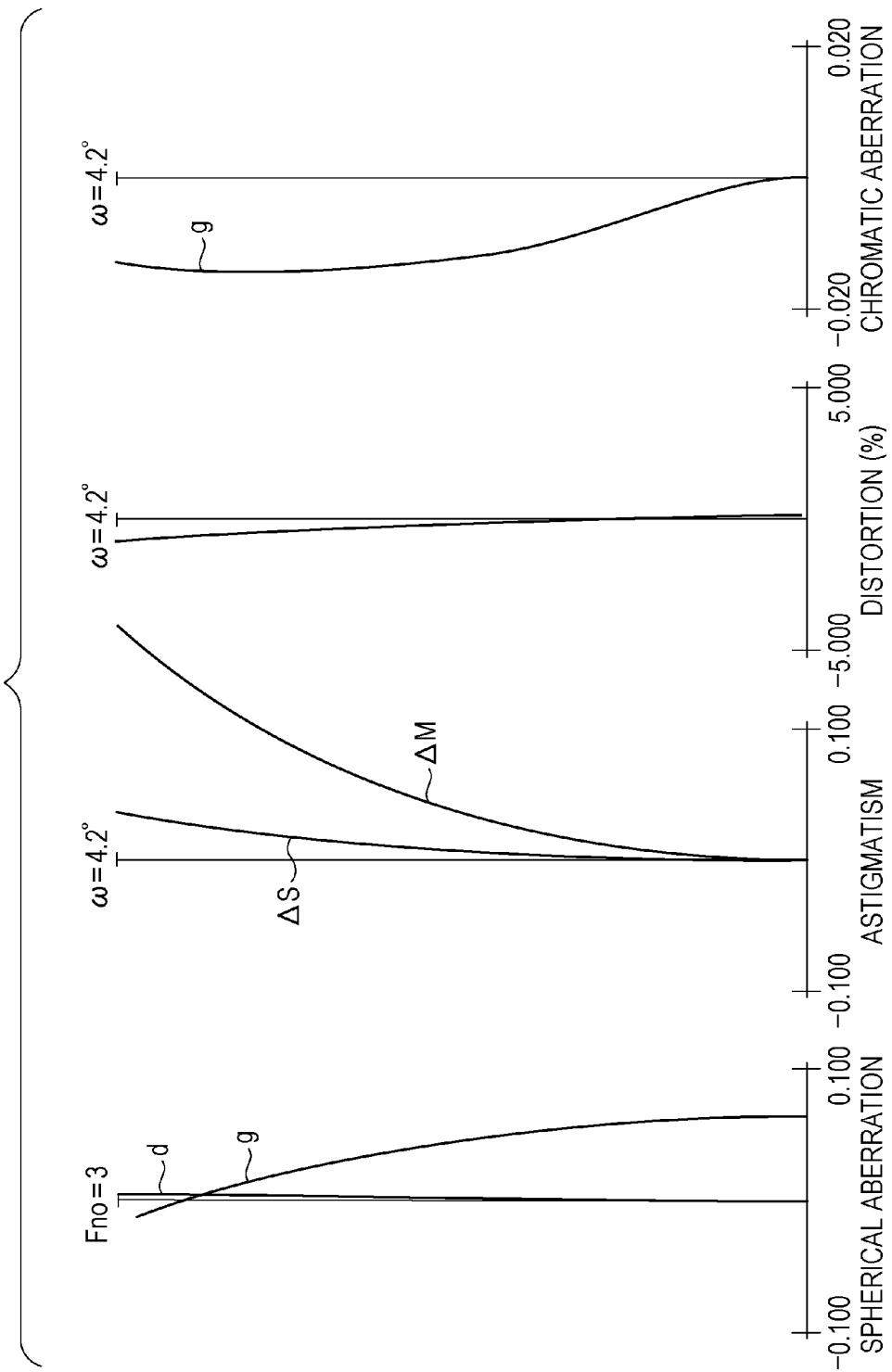

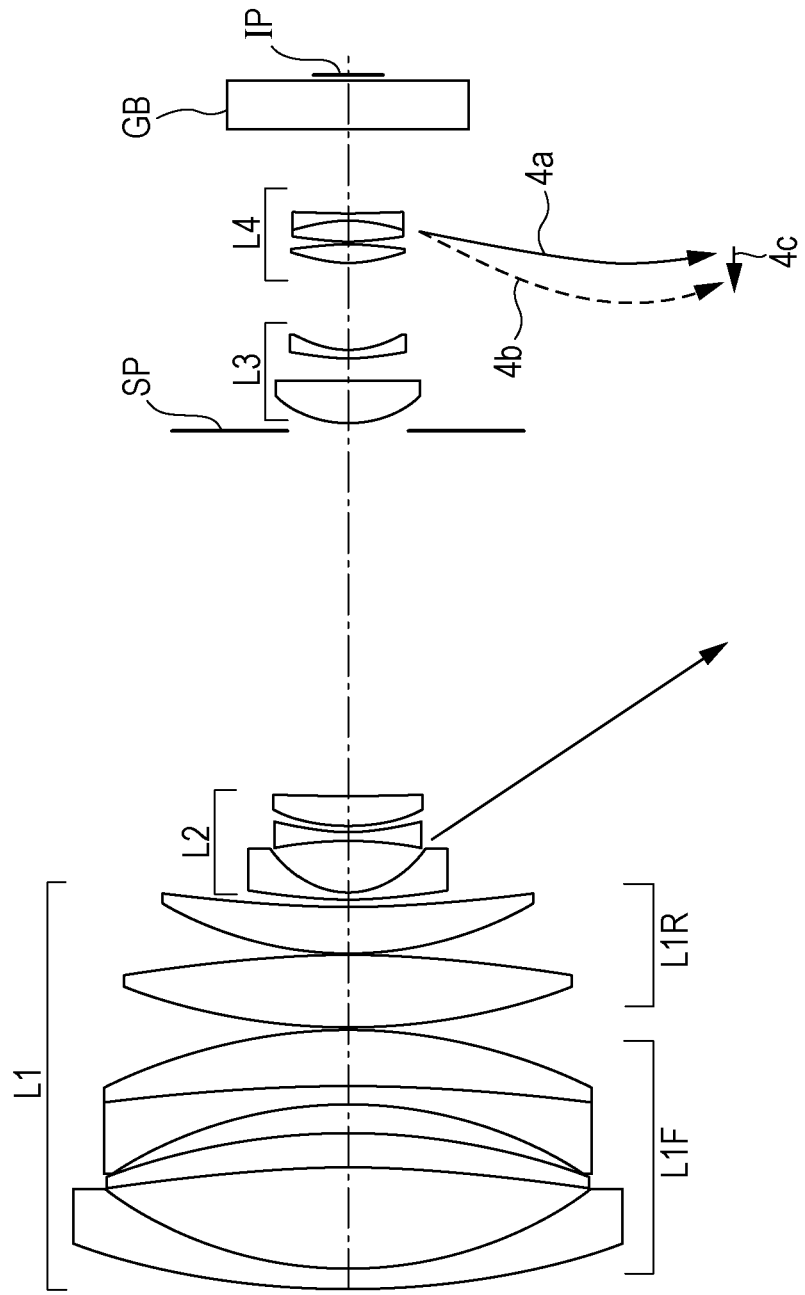

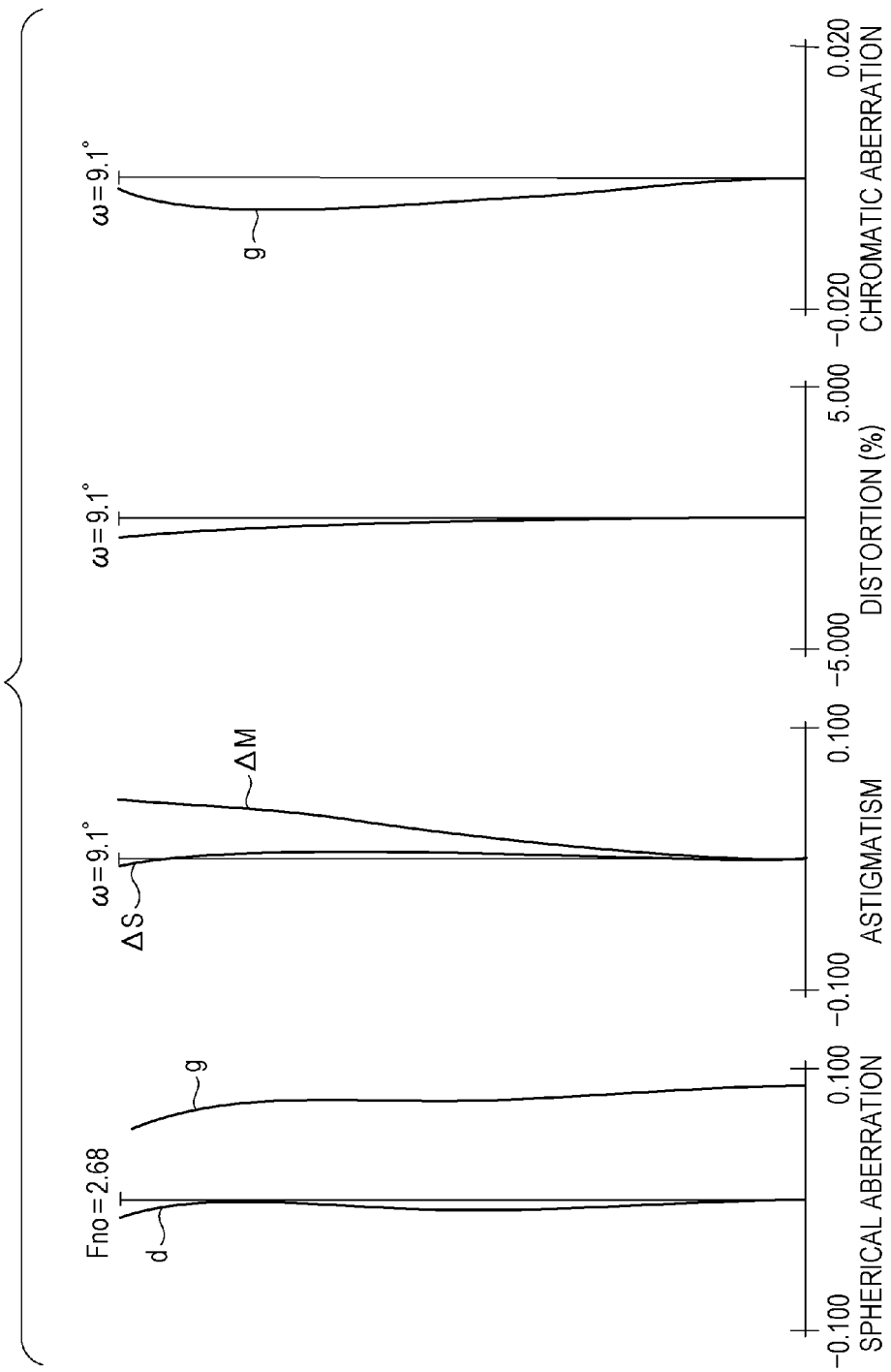

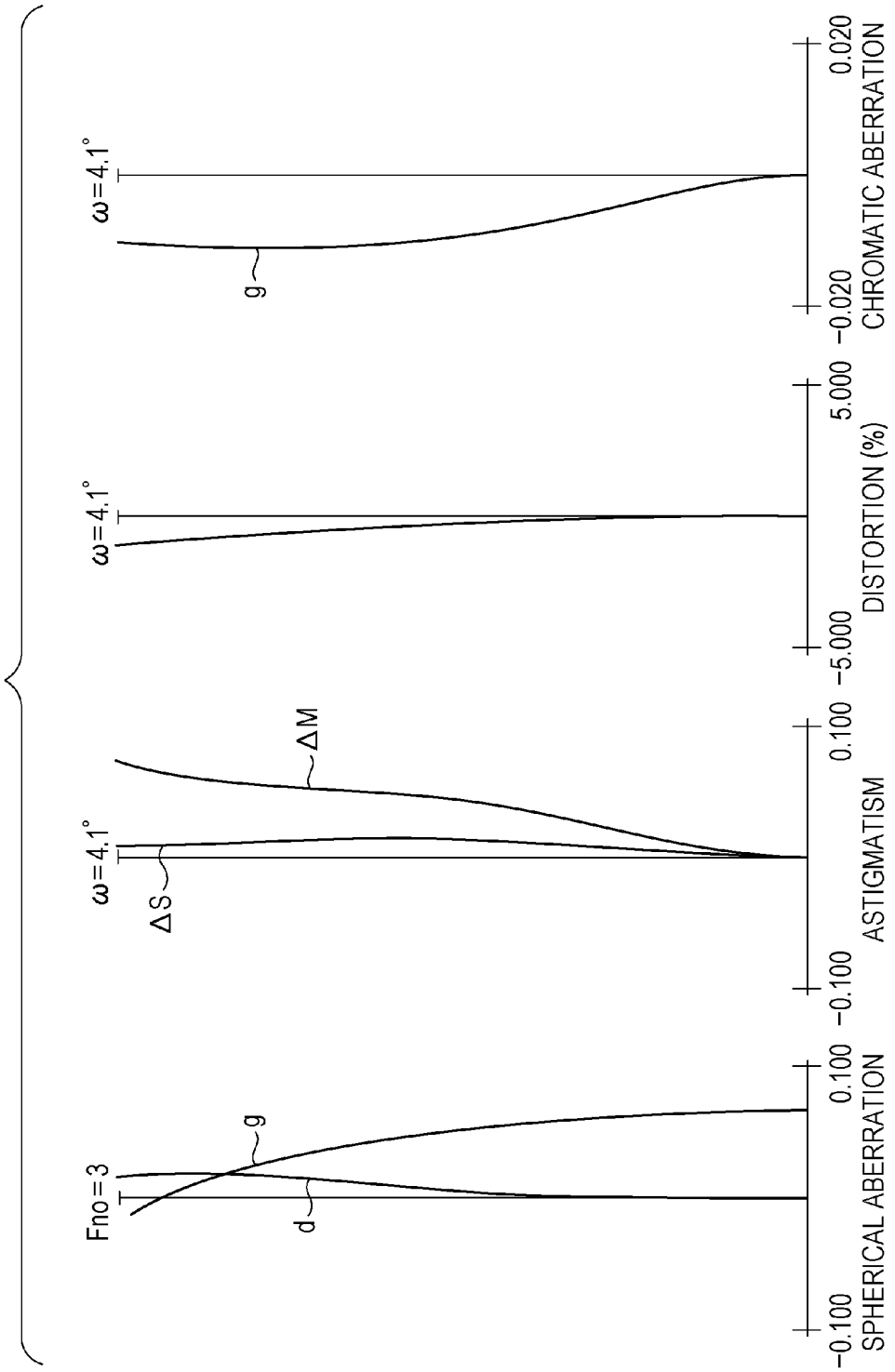

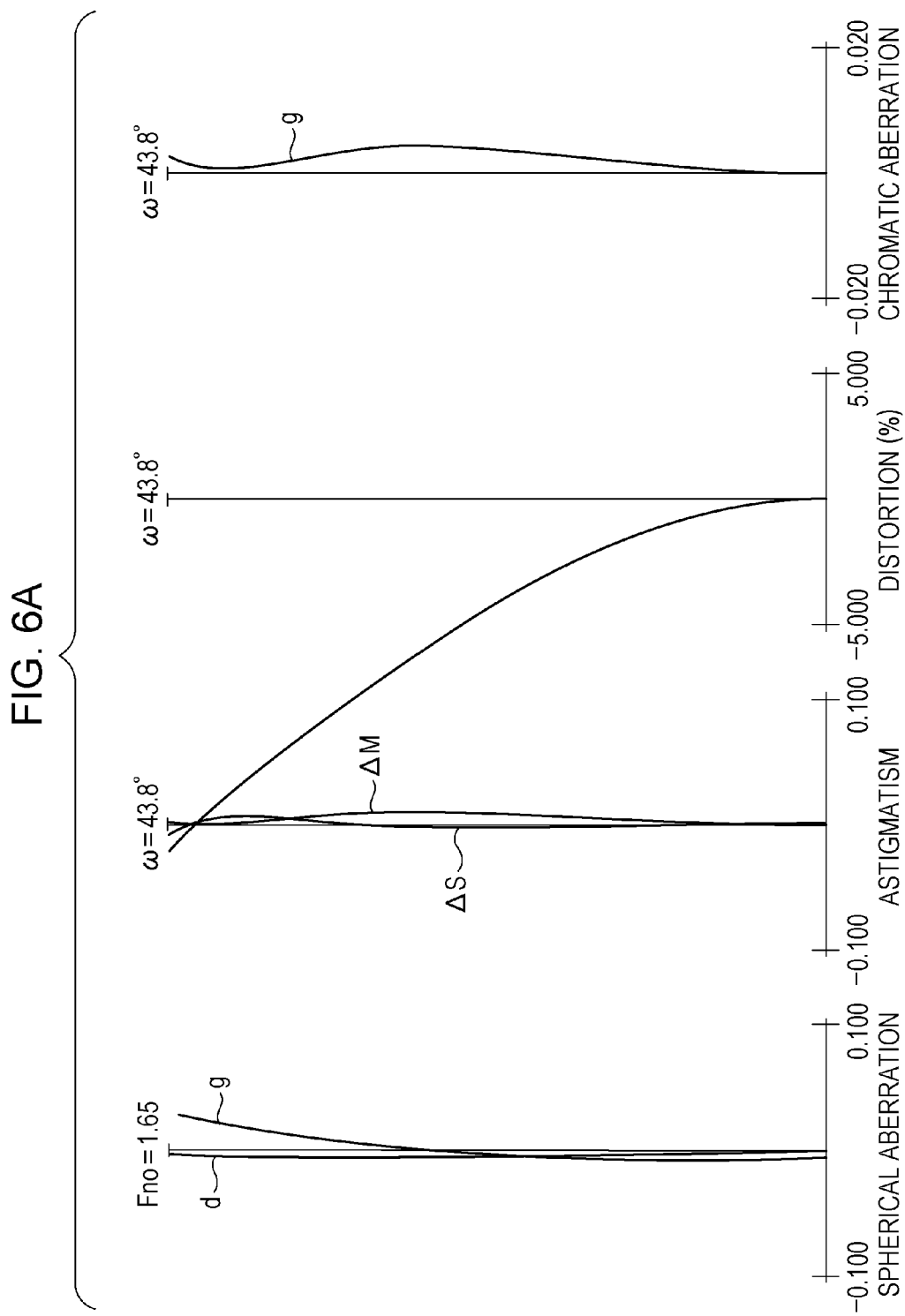

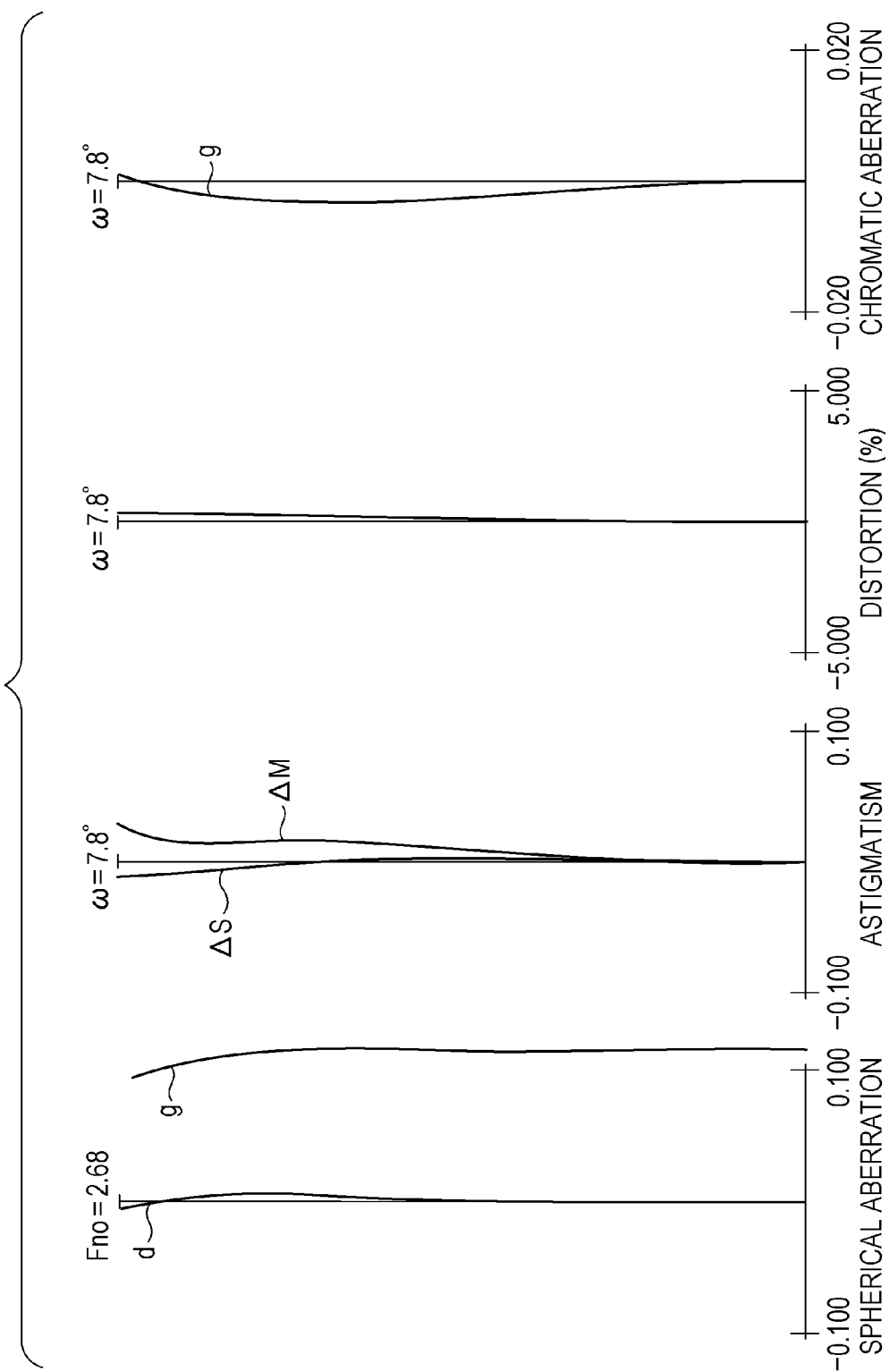

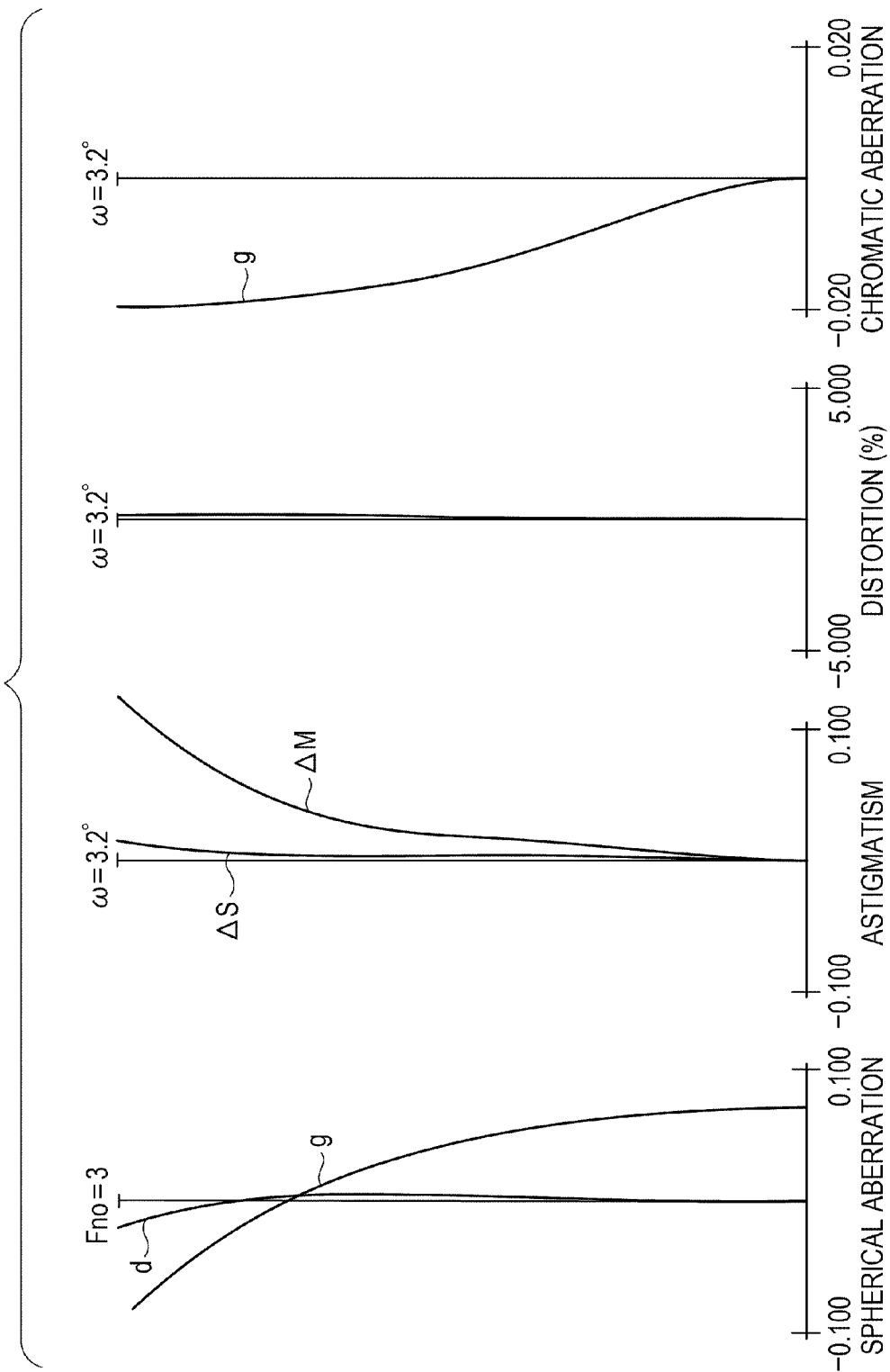

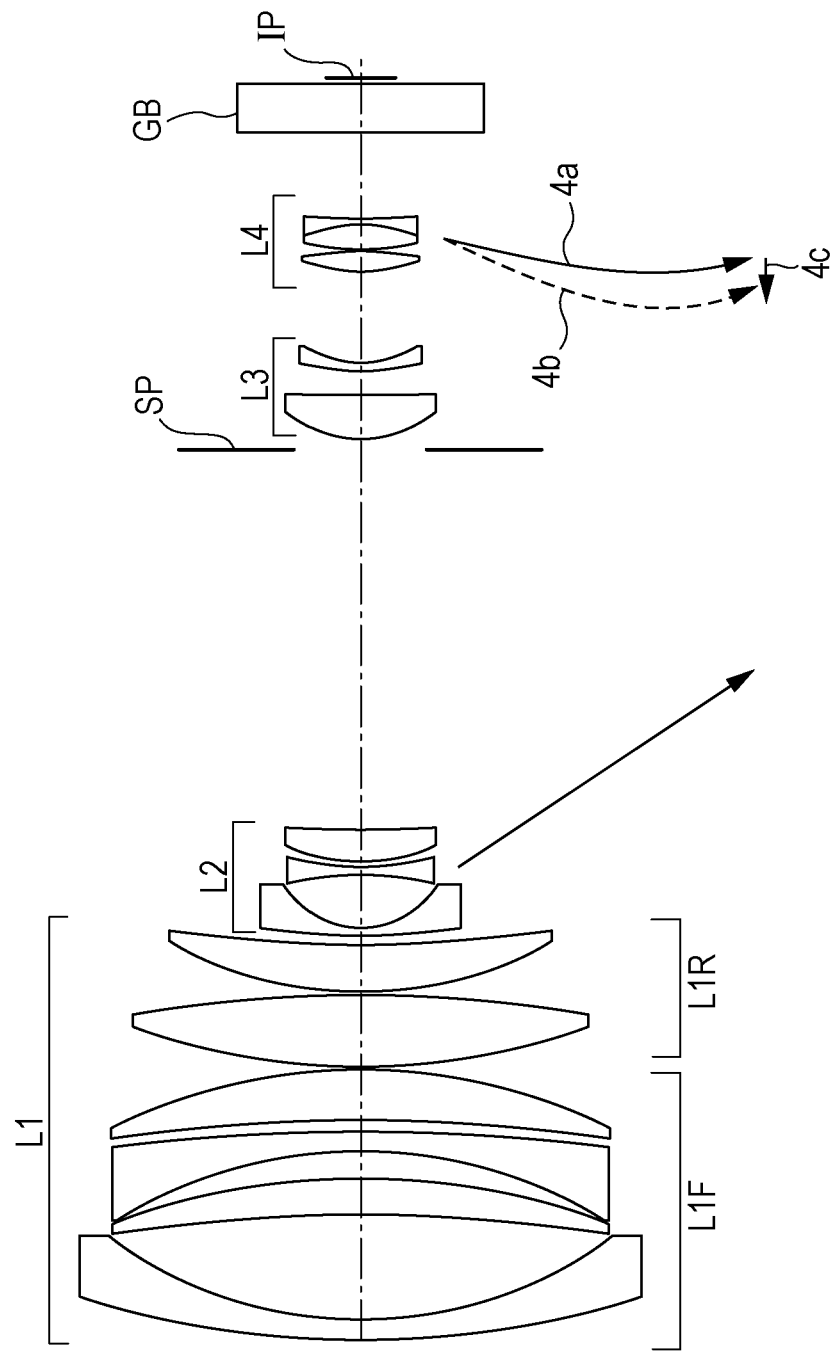

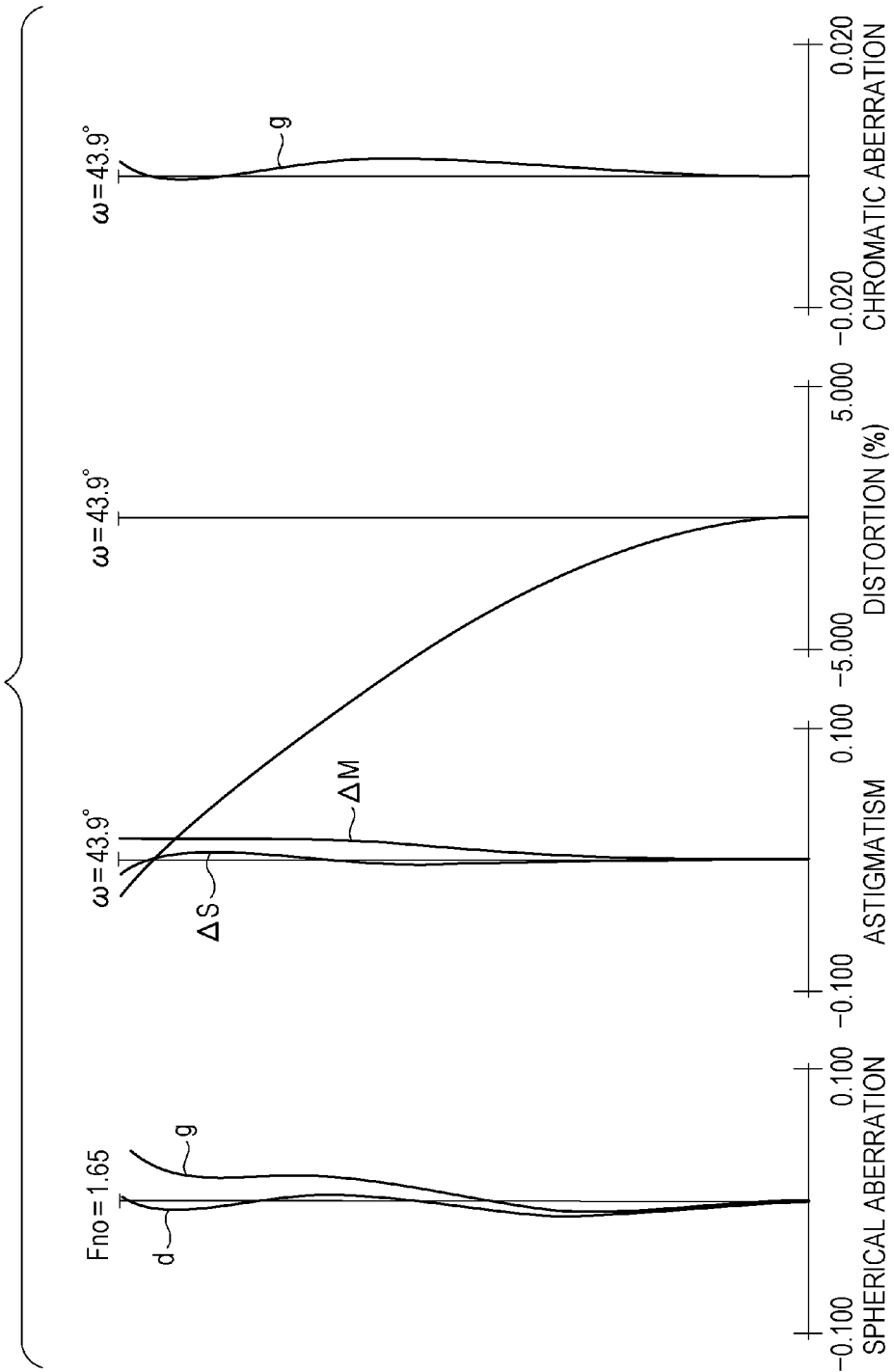

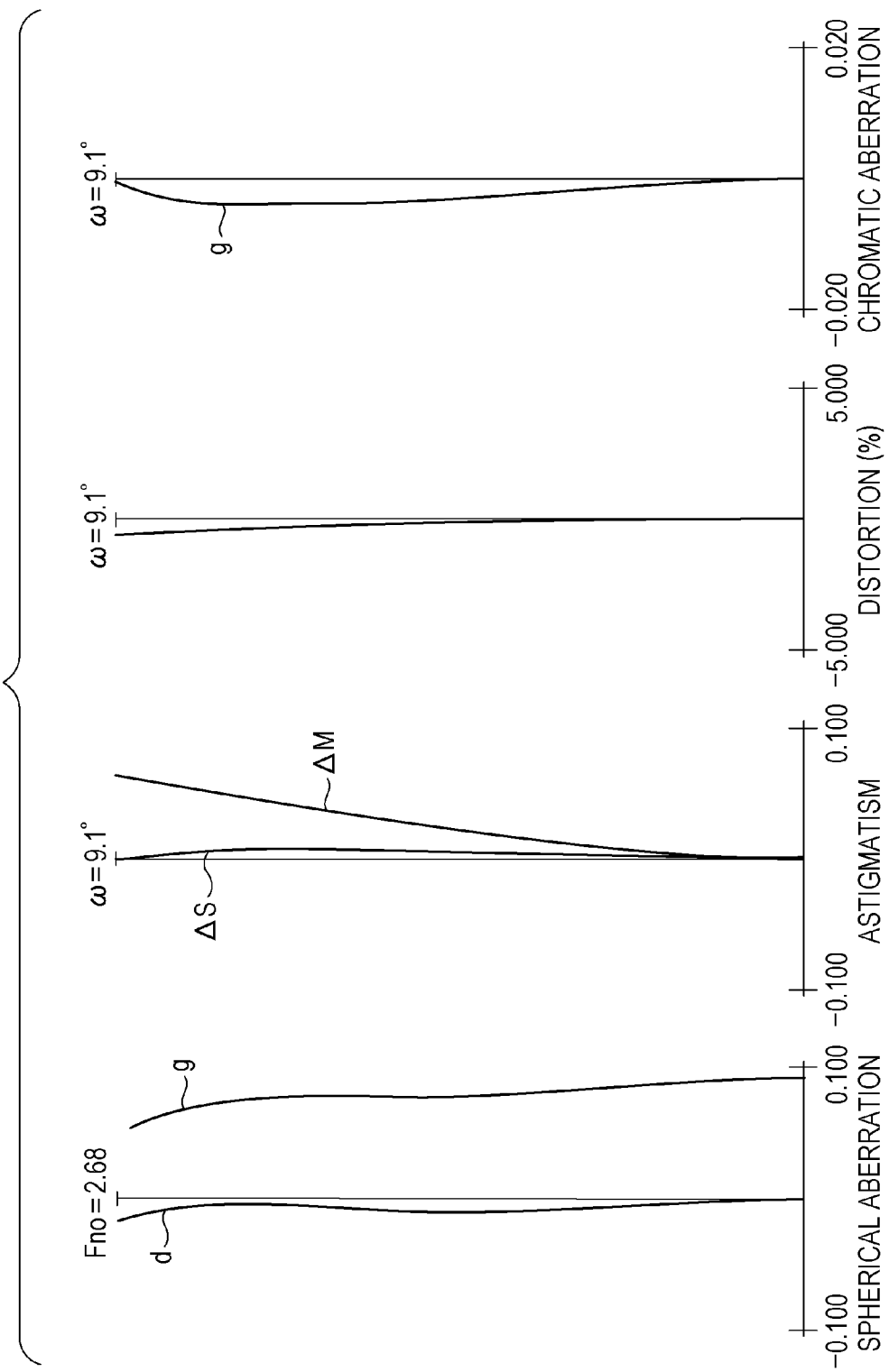

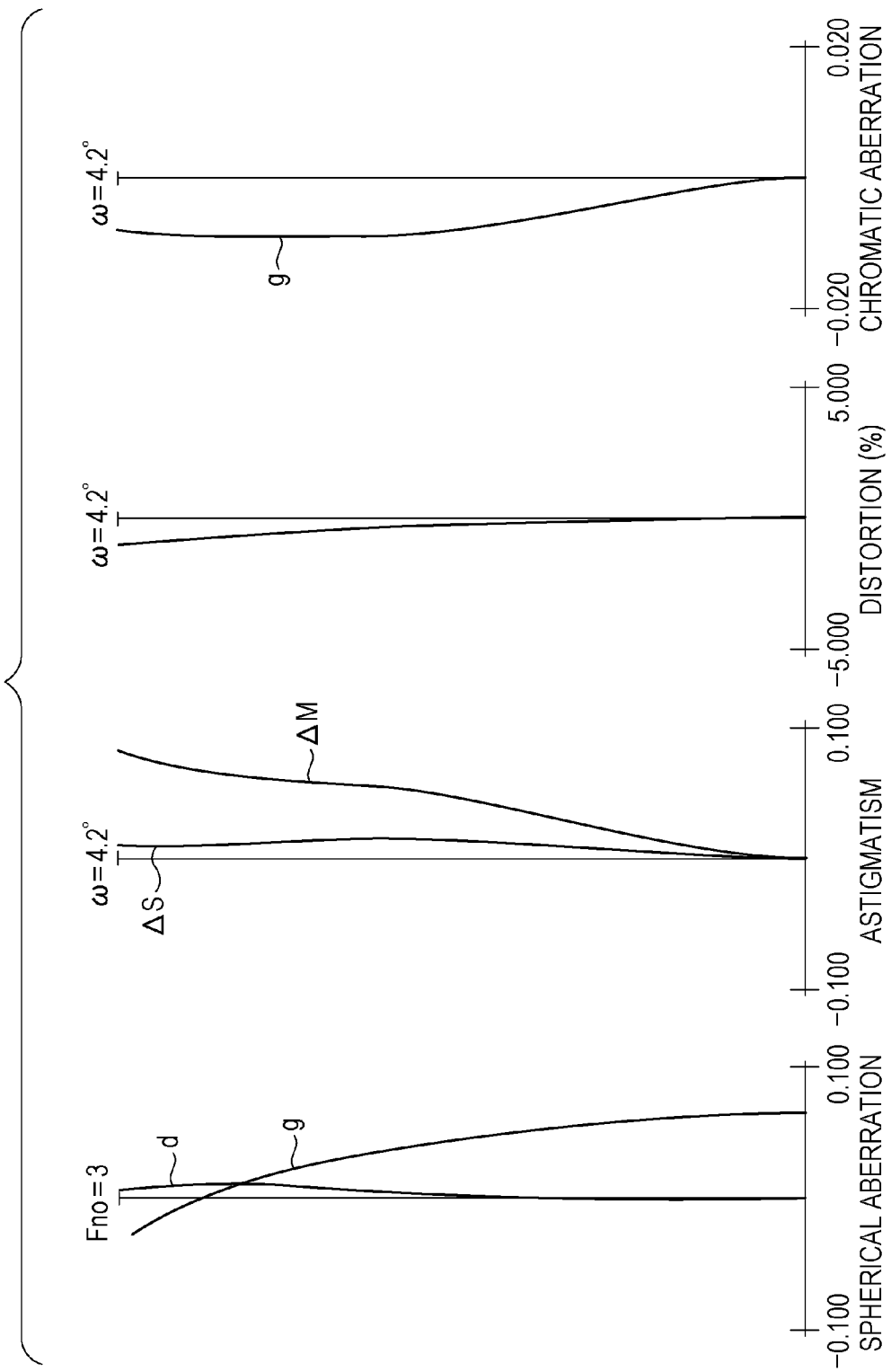

ZOOM LENS AND IMAGE PICKUP APPARATUS INCLUDING THE SAME

BACKGROUND OF THE INVENTION

1. Field of the Invention

The present invention relates to a zoom lens and an image pickup apparatus including the zoom lens, and more particularly, to a zoom lens suitable for an imaging lens used in an image pickup apparatus such as a digital still camera, a video camera, a surveillance camera, a TV camera, or a film camera.

2. Description of the Related Art

A zoom lens used as an imaging optical system in an image pickup apparatus, such as a video camera, a surveillance camera, or a digital still camera, using a solid-state image pickup element, is required to have a compact size, a wide angle of view, a high zoom ratio, and a high optical performance. As a zoom lens that meets these requirements, a four-unit zoom lens is known which includes, in order from an object side to an image side, a first lens unit having a positive refractive power, a second lens unit having a negative refractive power, a third lens unit having a positive refractive power, and a fourth lens unit having a positive refractive power. Of the lens units, the second lens unit is moved for zooming, and the fourth lens unit corrects an image plane variation due to zooming.

In the four-unit zoom lens, the first lens unit and the third lens unit do not move. When the angle of view is increased, the front-lens effective diameter increases, and this makes is difficult to reduce the size of the entire zoom lens. Accordingly, a zoom lens including a first lens unit formed by five or six lenses has been proposed to lessen an increase in the front-lens effective diameter when the angle of view is increased.

U.S. Pat. No. 7,463,427 discloses an embodiment in which a first lens unit includes five lenses, in order from the object side to the image side, a negative lens, a positive lens, a negative lens, a positive lens, and a positive lens, the imaging angle of view is about 78 degrees at a wide angle end, and the zoom ratio is about five to ten.

U.S. Pat. No. 7,760,440 discloses an embodiment in which a first lens unit includes six lenses, in order from the object side to the image side, a negative lens, a positive lens, a positive lens, a negative lens, a positive lens, and a positive lens, the imaging angle of view is about 80 degrees at a wide angle end, and the zoom ratio is about ten.

To realize size reduction of the entire zoom lens while ensuring a wide angle of view, the refractive powers of the lens units that constitute the zoom lens are increased. However, if the refractive powers of the lens units are simply increased, a change in aberration due to zooming increases, and it is therefore difficult to obtain a high optical performance over the entire zoom range.

To obtain a wide angle of view while maintaining a compact size of the above-described four-unit zoom lens, it is important to properly set the refractive power and lens configuration of the first lens unit and optical arrangement of the first lens unit and the second lens unit. Particularly when the lens configuration of the first lens unit is not properly set, it is difficult to reduce the size of the entire zoom lens while ensuring a wide angle of view, and changes in aberrations due to zooming increase. This makes it difficult to obtain a high optical performance.

SUMMARY OF THE INVENTION

The present invention provides a zoom lens having a wide angle of view, a compact size, and a high optical performance over the entire zoom range, and an imaging apparatus including the zoom lens.

A zoom lens according to an aspect of the present invention includes a first lens unit having a positive refractive power, a second lens unit having a negative refractive power and configured to move during a zooming operation, a third lens unit having a positive refractive power, and a fourth lens unit having a positive refractive power and configured to move during a zooming operation. The first lens unit has a negative lens located closest to an object side, and includes at least five lenses. The following conditional expressions are satisfied:

$$-5.0 < h12w/fw < -1.2$$

$$9.0 < f1/fw < 15.0$$

where $h12w$ represents a distance between principal points of the first lens unit and the second lens unit at a wide angle end, $fw$ represents a focal length of the entire zoom lens at the wide angle end, and $f1$ represents a focal length of the first lens unit.

Further features of the present invention will become apparent from the following description of exemplary embodiments with reference to the attached drawings.

BRIEF DESCRIPTION OF THE DRAWINGS

FIG. 1 is a lens cross-sectional view of a zoom lens according to a first embodiment at a wide angle end.

FIGS. 2A, 2B, and 2C are aberration diagrams of the zoom lens of the first embodiment, respectively, at the wide angle end, an intermediate zoom position, and a telephoto end.

FIG. 3 is a lens cross-sectional view of a zoom lens according to a second embodiment at a wide angle end.

FIGS. 4A, 4B, and 4C are aberration diagrams of the zoom lens of the second embodiment, respectively, at the wide angle end, an intermediate zoom position, and a telephoto end.

FIGS. 6A, 6B, and 6C are aberration diagrams of the zoom lens of the third embodiment, respectively, at the wide angle end, an intermediate zoom position, and a telephoto end.

FIG. 7 is a lens cross-sectional view of a zoom lens according to a fourth embodiment at a wide angle end.

FIGS. 8A, 8B, and 8C are aberration diagrams of the zoom lens of the fourth embodiment, respectively, at the wide angle end, an intermediate zoom position, and a telephoto end.

DESCRIPTION OF THE EMBODIMENTS

Embodiments of a zoom lens and an image pickup apparatus according to the present invention will be described below. A zoom lens of the present invention includes, in order from an object side to an image side, a first lens unit having a positive refractive power, a second lens unit having a negative refractive power and configured to move during zooming, a third lens unit having a positive refractive power, and a fourth lens unit having a positive refractive power and configured to move during zooming. The fourth lens unit moves during focusing. A lens unit having refractive power, such as a converter lens, is sometimes provided on at least one of an object side of the first lens unit and an image side of the fourth lens unit.

Figure 4A:
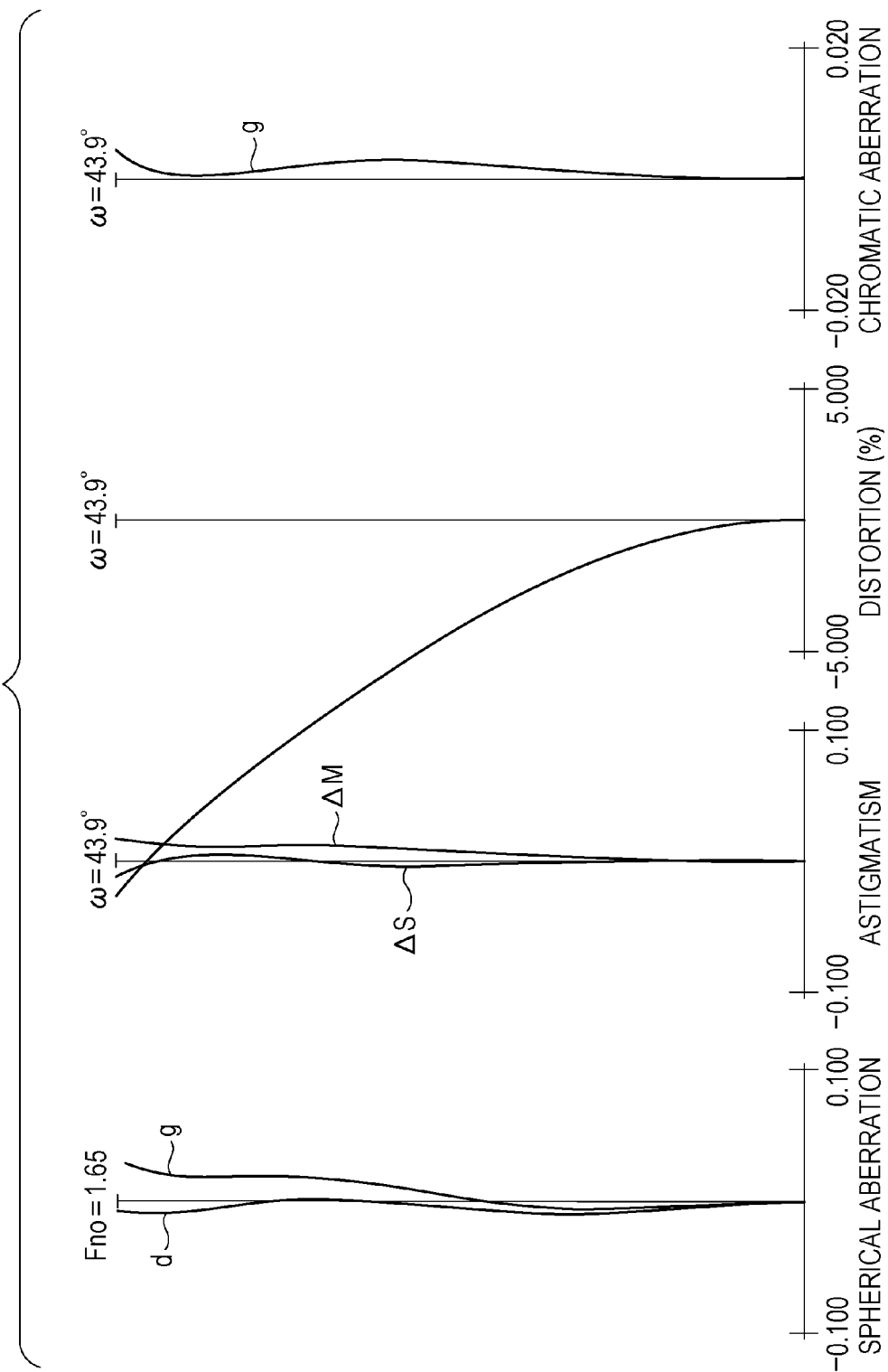

FIG. 1 is a lens cross-sectional view of a zoom lens according to a first embodiment of the present invention at a wide angle end (short focal-length end). FIGS. 2A, 2B, and 2C are aberration diagrams of the zoom lens of the first embodiment, respectively, at the wide angle end, an intermediate zoom position, and a telephoto end (long focal-length end). FIG. 3 is a lens cross-sectional view of a zoom lens according to a second embodiment of the present invention at a wide angle end. FIGS. 4A, 4B, and 4C are aberration diagrams of the zoom lens of the second embodiment, respectively, at the wide angle end, an intermediate zoom position, and a telephoto end.

Figure 5:
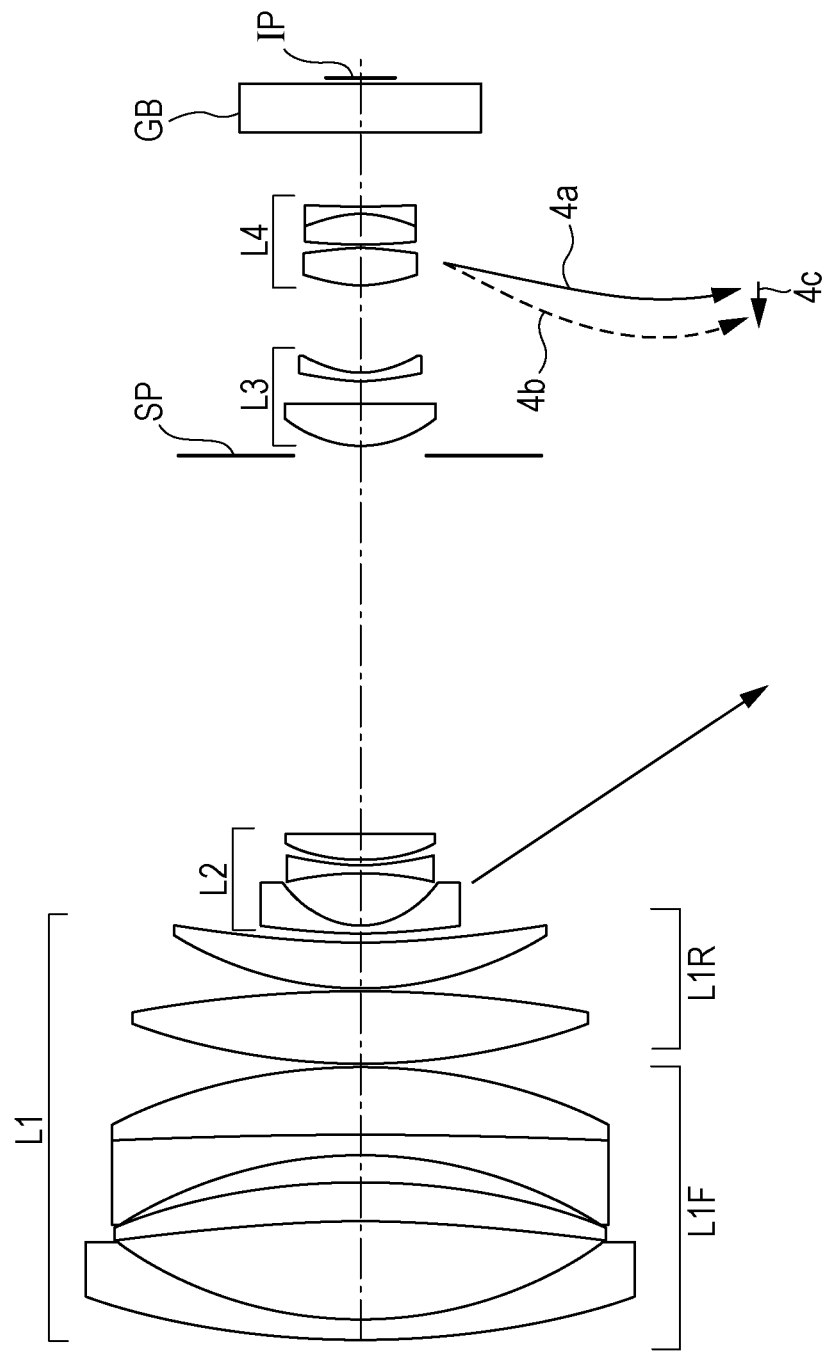
FIG. 5 is a lens cross-sectional view of a zoom lens according to a third embodiment at a wide angle end.
Figure 9:
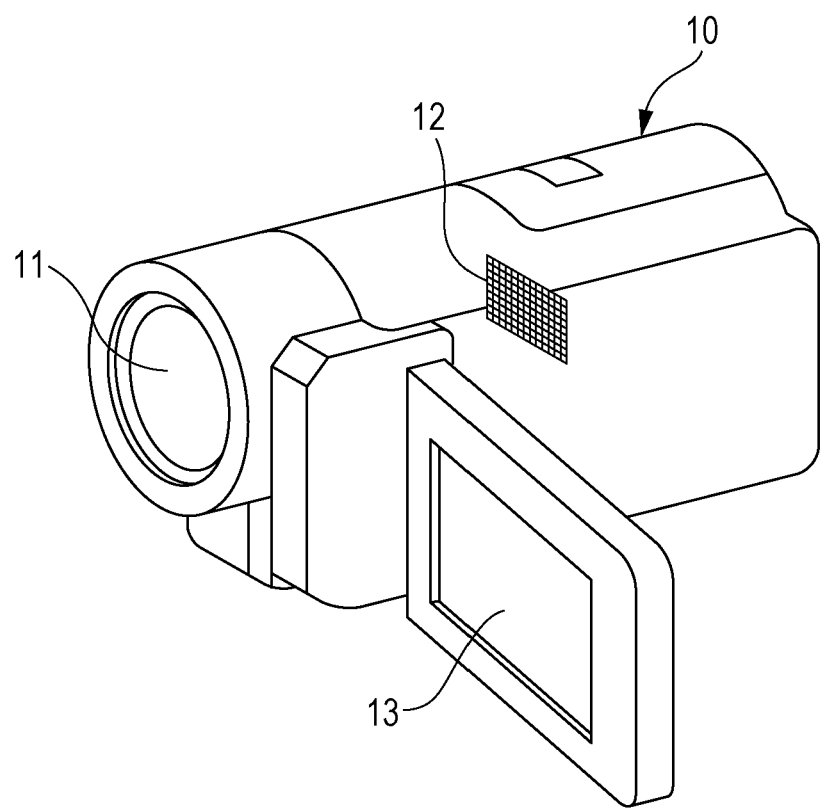
FIG. 9 is a schematic view illustrating the principal part of a video camera to which the zoom lens of the present invention is applied.

FIG. 5 is a lens cross-sectional view of a zoom lens according to a third embodiment of the present invention at a wide angle end. FIGS. 6A, 6B, and 6C are aberration diagrams of the zoom lens of the third embodiment, respectively, at the wide angle end, an intermediate zoom position, and a telephoto end. FIG. 7 is a lens cross-sectional view of a zoom lens according to a fourth embodiment of the present invention at a wide angle end. FIGS. 8A, 8B, and 8C are aberration diagrams of the zoom lens of the fourth embodiment, respectively, at the wide angle end, an intermediate zoom position, and a telephoto end. FIG. 9 is a schematic view illustrating the principal part of a video camera (image pickup apparatus) including the zoom lens of the present invention.

The zoom lenses of the embodiments are imaging lens systems for use in image pickup apparatuses such as a video camera and a digital camera. In the lens cross-sectional views, the left side is an object side (front side), and the right side is an image side (rear side). The zoom lenses of the embodiments may be used as projection lenses for projectors or the like. In this case, the left side is a side of a screen, and the right side is a side of a projected image side. In the lens cross-sectional views, L1 represents a first lens unit having a positive refractive power (optical power=reciprocal of focal length), L2 represents a second lens unit having a negative refractive power, L3 represents a third lens unit having a positive refractive power, and L4 represents a fourth lens unit having a positive refractive power. SP represents an aperture stop that determines a minimum F-number (Fno) light beam. The aperture stop SP is located on an object side of the third lens unit L3.

An optical block GB corresponds to an optical filter, a face plate, or an infrared cut-off filter. An image plane IP corresponds to an image pickup surface of a solid-state image pickup element (photoelectric conversion element), such as a CCD sensor or a CMOS sensor, when the zoom lens is used as an imaging optical system for a video camera or a digital camera, and to a film surface when the zoom lens is used as an imaging optical system for a silver-halide film camera. In the spherical aberration diagrams, a d-line and a g-line are shown. In the astigmatism diagrams, ΔM and ΔS represent a meridional image plane and a sagittal image plane, respectively. Fno represents the F-number, and ω represents the half angle of view. In the following embodiments, the wide angle end and the telephoto end refer to zoom positions provided when the lens unit for zooming (second lens unit L2) is positioned at opposite ends of a mechanical movable range on the optical axis.

In the embodiments, zooming from the wide angle end to the telephoto end is performed by moving the second lens unit L2 to the image side, as shown by an arrow. An image plane variation due to zooming is corrected by moving the fourth lens unit L4 to the object side along a part of a convex path. By thus moving the fourth lens unit L4 to the object side along the convex path, the space between the third lens unit L3 and the fourth lens unit is effectively utilized, and the total lens length is shortened effectively.

Also, a rear focus method for performing focusing by moving the fourth lens unit L4 on the optical axis is adopted. A solid curve 4a and a dotted curve 4b relating to the fourth lens unit L4 indicate moving paths along which the fourth lens unit L4 moves to correct an image plane variation due to zooming from the wide angle end to the telephoto end while the focus is on an object at infinity and a near object. For example, focusing from the object at infinity to the near object at the telephoto end is performed by moving the fourth lens unit L4 forward, as shown by arrow 4c.

In the embodiments, the first lens unit L1, the third lens unit L3, and the aperture stop SP do not move for zooming and focusing. However, the first lens unit L1, the third lens unit L3, and the aperture stop SP may be moved for aberration correction, as required.

In the embodiments, the first lens unit L1 has a negative lens located closest to the object side, and includes a total of five or more lenses. The following conditional expression is satisfied:

$$-5.0 < h12w/fw < -1.2 \quad (1)$$

$$9.0 < f1/fw < 15.0 \quad (2)$$

where h12w represents the distance between the principal points of the first lens unit L1 and the second lens unit L2 at the wide angle end, fw represents the focal length of the entire zoom lens at the wide angle end, and f1 represents the focal length of the first lens unit.

In the zoom lenses of the embodiments, the first lens unit having a positive refractive power and the second lens unit L2 having a negative refractive power are arranged in order from the object side to the image side in order to obtain a wide angle of view and a high optical performance. Although it is advantageous in the increase in the imaging angle of view for the first lens unit to have a negative refractive power, the F-number is likely to be small at the telephoto end in this case. For this reason, the first lens unit has a positive refractive power. The second lens unit is moved for zooming, and the fourth lens unit is moved to correct an image plane variation due to zooming.

Since the two lens units are thus moved during zooming, the number of driving units, such as motors, for driving the lens units is minimized. This reduces the total size of the lens barrel. Further, since the negative lens is located on the side of the first lens unit L1 closest to the object side, a wide angle of view and a compact size of the entire zoom lens are achieved.

With the above-described lens system, when off-axis rays are traced back from the image plane, they are diffused greatly at the negative lens closest to the object side, and this makes the image-side lens smaller than the negative lens. Further, since the first lens unit L1 includes five or more lenses, aberration is easily corrected when the refractive power of the first lens unit L1 is increased. By satisfying Conditional Expressions (1) and (2), a high optical performance is obtained over the entire zoom range while ensuring a wide angle of view and a compact lens system.

Conditional Expression (1) specifies the distance between the principal points of the first lens unit L1 and the second lens unit L2 at the wide angle end. By satisfying Conditional Expression (1), the front-lens effective diameter is decreased while ensuring a wide angle of view. When the value falls below the lower limit in Conditional Expression (1) and the distance between the principal points becomes too short, the front-lens effective diameter is effectively decreased, but it is difficult to suppress an image plane variation due to zooming. In contrast, when the value exceeds the upper limit in Conditional Expression (1) and the distance between the principal points becomes too long, it is difficult to decrease the front-lens effective diameter.

Conditional Expression (2) specifies the focal length of the first lens unit L1. By satisfying Conditional Expression (2), a high optical performance can easily be obtained while ensuring a wide angle of view. When the value falls below the lower limit in Conditional Expression (2) and the refractive power of the first lens unit L1 becomes too large, it is difficult to correct spherical aberration, axial chromatic aberration, curvature of field, etc at the telephoto end. In contrast, when the value exceeds the upper limit in Conditional Expression (2) and the refractive power of the first lens unit L1 becomes too small, spherical aberration and curvature of field are easily corrected, but the total lens length increases. As a result, the total size of the lens system increases.

It is preferable to set the numerical ranges in Conditional Expressions (1) and (2) as follows:

$$-4.5 < h12w/fw < -1.25 \quad (1a)$$

$$8.5 < f1/fw < 14.0 \quad (2a).$$

It is more preferable to set the numerical ranges in Conditional Expressions (1a) and (2a) as follows because the advantages of the above-described Conditional Expressions are maximized:

$$-4.0 < h12w/fw < -1.3 \quad (1b)$$

$$9.0 < f1/fw < 12.0 \quad (2b).$$

In the embodiments, the first lens unit L1 includes a front lens group L1F having, in order from the object side to the image side, a negative lens, a positive lens, a negative lens, and a positive lens, and a rear lens group L1R including two positive lenses. At least one of the following conditional expressions is satisfied preferably:

$$-8.0 < (R31+R22)/(R31-R22) < -1.0 \quad (3)$$

$$-5.0 < ff/fr < -1.0 \quad (4)$$

$$-4.0 < f2/fw < -1.5 \quad (5)$$

$$-8.0 < f1/f2 < -2.0 \quad (6)$$

where R22 represents the radius of curvature of an image-side lens surface of a second lens that is in a second lens position in the first lens unit L1 from the object side, R31 represents the radius of curvature of an object-side lens surface of a third lens that is in a third position in the first lens unit L1 from the object side, ff represents the focal length of the front lens group L1F, fr represents the focal length of the rear lens group L1R, and f2 represents the focal length of the second lens unit L2.

Next, technical meanings of the above Conditional Expressions will be described. Conditional Expression (3) specifies the shape of an air lens having a negative refractive power that is defined by the second and third lenses that are in the second and third positions in the first lens unit L1 from the object side to the image side. By satisfying Conditional Expression (3), the front-lens effective diameter is decreased, and a high optical performance is obtained. When the value falls below the lower limit in Conditional Expression (3) and the curvature of the lens surface becomes too large, it is difficult to correct curvature of field and astigmatism at the wide angle end. In contrast, when the value exceeds the upper limit in Conditional Expression (3) and the curvature of the lens surface becomes too small, it is difficult to correct spherical aberration at the telephoto end.

Conditional Expression (4) specifies the ratio between the focal lengths of the front lens group L1F and the rear lens group L1R that constitute the first lens unit L1. By satisfying Conditional Expression (4), the front-lens effective diameter is easily decreased while ensuring a wide angle of view. When the value falls below the lower limit in Conditional Expression (4) and the refractive power of the front lens group L1F becomes too small, the front-lens effective diameter increases. In contrast, when the value exceeds the upper limit in Conditional Expression (4) and the refractive power of the front lens group L1F becomes too large, it is difficult to correct curvature of field and astigmatism particularly at the wide angle end.

Conditional Expression (5) specifies the focal length of the second lens unit L2. By satisfying Conditional Expression (5), the zoom stroke (moving amount) of the second lens unit L2 for zooming is decreased, thereby shortening the total lens length. Also, the front-lens effective diameter is decreased. When the value falls below the lower limit in Conditional Expression (5) and the focal length of the second lens unit L2 becomes too long, the zoom stroke of the second lens unit L2 for zooming increases, and the total lens length increases. In contrast, when the value exceeds the upper limit in Conditional Expression (5) and the focal length of the second lens unit L2 becomes too short, a variation in curvature of field due to zooming increases.

Conditional Expression (6) specifies the ratio between the focal lengths of the first lens unit and the second lens unit. By satisfying Conditional Expression (6), a high optical performance is easily obtained while ensuring a wide angle of view and a small lens system. When the value falls below the lower limit in Conditional Expression (6) and the focal length of the second lens unit L2 becomes too short, a variation in curvature of field due to zooming increases. In contrast, when the value exceeds the upper limit in Conditional Expression (6) and the focal length of the first lens unit L1 becomes too short, it is difficult to correct spherical aberration, axial chromatic aberration, curvature of field, etc. at the telephoto end.

It is preferable to set the numerical ranges in Conditional Expressions (3) to (6) as follows:

$$-6.0 < (R31+R22)/(R31-R22) < -1.5 \quad (3a)$$

$$-4.5 < ff/fr < -1.5 \quad (4a)$$

$$-3.6 < f2/fw < -1.8 \quad (5a)$$

$$-7.0 < f1/f2 < -2.5 \quad (6a).$$

It is more preferable to set the numerical ranges in Conditional Expressions (3a) to (6a) as follows:

$$-5.0 < (R31+R22)/(R31-R22) < -2.0 \quad (3b)$$

$$-4.0 < ff/fr < -2.0 \quad (4b)$$

$$-3.3 < f2/fw < -2.0 \quad (5b)$$

$$-6.0 < f1/f2 < -3.0 \quad (6b).$$

In the embodiments, the first lens unit L1 preferably includes two or more negative lenses. When the negative lenses are located on the object side of the first lens unit L1, the image-side principal point of the first lens unit L1 can be located close to the second lens unit L2. Hence, the angle of view is increased advantageously. For this reason, two negative lenses are preferably located on the object side. The front lens group L1F of the first lens unit L1 includes, in order from the object side to the image side, a negative meniscus lens having a convex lens surface on the object side, a positive lens having a convex lens surface on the image side, a negative lens having a concave lens surface on the object side, and a positive lens having a convex lens surface on the image side.

The rear lens group L1R includes, in order from the object side to the image side, a positive lens having both convex lens surfaces and a positive lens having a convex lens surface on the object side. Since the light-weight fourth lens unit L4 having a relatively small lens outer diameter serves as a focusing lens unit, it can be driven with a small force. Thus, quick focusing can be achieved easily.

An image pickup apparatus of the present invention includes an image pickup element that receives an optical image formed by the zoom lens. As the image pickup element, for example, a charge coupled device (CCD) or a complementary metal oxide semiconductor (CMOS) can be used. The image pickup apparatus also includes a correction unit that corrects distortion caused in the zoom lens by an electrical method. Unlike a silver-halide film camera, a digital camera or the like has a property of being able to acquire an image as digital data. By utilizing this property, an image obtained from the lens is subjected to image conversion so that aberrations of the image are minimized.

For example, an image corrected more for aberrations than in the related art can be obtained by electrically correcting distortion and chromatic aberration. Further, the use of an aspherical surface and anomalous dispersion glass can be minimized.

Descriptions will be given of the configurations of the second lens unit L2 to the fourth lens unit L4 in the embodiments. The absolute value of the refractive power of the second lens unit L2 is larger on the image side than on the object side, and the second lens unit L2 includes a negative lens having a concave lens surface on the image side, a negative lens having both concave lens surfaces, and a positive lens having a convex lens surface on the object side. In the zoom lenses of the embodiments, the negative refractive power of the second lens unit L2 is increased to reduce the effective diameter of the first lens unit L1 while ensuring a wide angle of view at the wide angle end. In this case, aberrations occur in the second lens unit L2, in particular, much distortion and curvature of field occur at the wide angle end.

In the embodiments, the negative refractive power of the second lens unit L2 is shared by two negative lenses in order to reduce curvature of field while permitting distortion. Such a lens configuration provides a small front-lens effective diameter and a high optical performance while ensuring a wide angle of view. The third lens unit L3 includes a positive lens having a convex lens surface on the object side and a negative lens having a concave lens surface on the image side. In numerical examples of the zoom lenses, the configuration of the third lens unit is properly set to obtain a high optical performance while shortening the total lens length. That is, the third lens unit L3 is formed by two lenses, the positive lens and the negative lens, to achieve achromatism, and the positive lens is aspherical to correct spherical aberration.

The fourth lens unit L4 includes a positive lens and a cemented lens formed by a positive lens and a negative lens joined to each other. In the embodiments, the fourth lens unit L4 is formed by a small number of lenses for the purpose of thickness and weight reduction. This also reduces a variation in chromatic aberration due to zooming and focusing.

According to the above-described embodiments, it is possible to obtain a zoom lens that has a compact lens system and a high optical performance over the entire zoom range while ensuring an imaging angle of view of 85 or more degrees at the wide angle end.

Next, with reference to FIG. 9, a description will be given of an example of a digital video camera using the zoom lens of the present invention as an imaging optical system. Referring to FIG. 9, the digital video camera includes a camera body 10, an imaging optical system 11 formed by the zoom lens according to any of the first to fourth embodiments, a solid-state image pickup element (photoelectric conversion element) 12, such as a CCD or a CMOS, included in the camera body 10 so as to receive an optical object image formed by the imaging optical system 11, and a viewfinder 14 formed by, for example, a liquid crystal display panel. Through the viewfinder 14, the object image formed on the solid-state image pickup element 12 is viewed.

While the preferred embodiments of the present invention have been described above, the present invention is not limited to these embodiments, and various modifications and alterations are possible within the scope of the invention.

Next, first to fourth numerical examples corresponding to the first to fourth embodiments of the present invention will be given below. In the numerical examples, i represents the order number of the lens surface counted from the object side, ri represents the radius of curvature of the i-th lens surface from the object side, di represents the surface distance between the i-th lens surface and the i+1-th lens surface from the object side, and ni and vi respectively represent the refractive index and the Abbe number of the material of the i-th lens for the d-line. Further, the aspherical surface shape is given by the following expression:

$$X=(h^2/R)/[1+[1-(1+K)(h/R)^2]^{1/2}]+A4h^4+A6h^6+A8h^8+A10h^{10}$$

where k is a conic constant, A4, A6, A8, and A10 are four-, six-, eight-, and ten-order aspherical coefficients, and x represents the displacement in the optical axis direction at a height h from the optical axis with reference to the vertex of the surface. R represents the radius of curvature, and "e-X" means "$\times 10^{-X}$". In the numerical examples, the surface number of the aspherical lens surface is marked with "*" on the right side.

A back focus BF represents the distance from the final lens surface of the glass block to the paraxial image plane. The total lens length is defined as the sum of the distance from the forefront lens surface to the final lens surface of the glass block, and the back focus BF. The length is expressed in millimeters. The relationships between the numerical examples and the above-described conditional expressions are shown in Table.

First Numerical Example

| Unit mm | | | | |
|---|---|---|---|---|
| Surface Data | | | | |
| Surface No. | r | d | nd | vd |
| 1 | 107.068 | 2.20 | 2.00069 | 25.5 |
| 2 | 35.070 | 8.46 | | |
| 3 | −1192.690 | 4.70 | 1.48749 | 70.2 |
| 4 | −80.519 | 3.97 | | |
| 5 | −35.196 | 2.00 | 1.69895 | 30.1 |
| 6 | −4022.775 | 5.26 | 1.80400 | 46.6 |
| 7 | −49.538 | 0.20 | | |
| 8 | 82.474 | 5.12 | 1.60311 | 60.6 |
| 9 | −81.176 | 0.20 | | |
| 10 | 32.774 | 4.14 | 1.69680 | 55.5 |
| 11 | 155.749 | (variable) | | |
| 12 | 35.780 | 0.70 | 1.83481 | 42.7 |
| 13 | 7.479 | 4.52 | | |
| 14 | −30.808 | 0.70 | 1.80400 | 46.6 |
| 15 | 21.273 | 0.66 | | |
| 16 | 15.903 | 1.97 | 1.95906 | 17.5 |

-continued

Unit mm

| | | | | |
|---|---|---|---|---|
| 17 | 76.029 | (variable) | | |
| 18 (Stop) | ∞ | 0.70 | | |
| 19* | 9.400 | 3.31 | 1.69350 | 53.2 |
| 20* | 1048.075 | 2.17 | | |
| 21 | 21.485 | 0.70 | 1.80610 | 33.3 |
| 22 | 8.085 | (variable) | | |
| 23 | 12.681 | 2.13 | 1.69680 | 55.5 |
| 24 | −34.677 | 0.30 | | |
| 25 | 30.396 | 3.35 | 1.60311 | 60.6 |
| 26 | −9.995 | 0.70 | 1.92286 | 18.9 |
| 27 | −464.076 | (variable) | | |
| 28 | ∞ | 4.20 | 1.51633 | 64.1 |
| 29 | ∞ | | | |
| Image Plane | | | | |

Aspherical Surface Data

Nineteenth Surface $K = -6.45262e-001$
$A3 = 6.34587e-005\ A5 = 7.85935e-006\ A7 = 1.74595e-007$
$A9 = -2.57266e-010$ Twentieth Surface $K = 0.00000e+000$
$A3 = 1.10048e-004\ A5 = 2.44525e-005\ A7 = -1.79303e-007$
$A9 = 1.49523e-009$ Various Data
Zoom ratio 9.99

| | Wide angle end | Intermediate position | Telephoto end |
|---|---|---|---|
| Focal length | 3.40 | 16.51 | 33.99 |
| F-number | 1.65 | 2.68 | 3.00 |
| Angle of view | 41.41 | 10.30 | 5.04 |
| Image height | 3.00 | 3.00 | 3.00 |
| Total lens length | 104.92 | 104.92 | 104.92 |
| BF | 0.50 | 0.50 | 0.50 |
| d11 | 0.80 | 22.09 | 28.81 |
| d17 | 30.52 | 9.24 | 2.51 |
| d22 | 6.07 | 3.05 | 5.13 |
| d27 | 4.68 | 7.70 | 5.62 |

Zoom Lens Unit Data

| Unit | First Surface | Focal length |
|---|---|---|
| 1 | 1 | 32.19 |
| 2 | 12 | −9.55 |
| 3 | 18 | 29.67 |
| 4 | 23 | 14.26 |
| 5 | 28 | ∞ |

Second Numerical Example

Unit mm

Surface Data

| Surface No. | r | d | nd | νd |
|---|---|---|---|---|
| 1 | 77.600 | 1.80 | 1.84666 | 23.9 |
| 2 | 35.908 | 9.12 | | |
| 3 | −120.693 | 3.08 | 1.48749 | 70.2 |
| 4 | −60.255 | 2.51 | | |

-continued

Unit mm

| | | | | |
|---|---|---|---|---|
| 5 | −38.556 | 1.70 | 1.80610 | 33.3 |
| 6 | −149.767 | 4.93 | 1.77250 | 49.6 |
| 7 | −47.670 | 0.20 | | |
| 8 | 56.584 | 6.41 | 1.60311 | 60.6 |
| 9 | −111.309 | 0.15 | | |
| 10 | 31.613 | 4.16 | 1.60311 | 60.6 |
| 11 | 99.108 | (variable) | | |
| 12 | 51.558 | 0.70 | 1.83481 | 42.7 |
| 13 | 7.588 | 4.56 | | |
| 14 | −25.580 | 0.60 | 1.80400 | 46.6 |
| 15 | 20.458 | 0.58 | | |
| 16 | 16.326 | 2.73 | 1.92286 | 18.9 |
| 17 | 262.277 | (variable) | | |
| 18(Stop) | ∞ | 0.80 | | |
| 19* | 9.103 | 3.80 | 1.58313 | 59.4 |
| 20* | −200.450 | 2.04 | | |
| 21 | 18.423 | 0.70 | 1.83400 | 37.2 |
| 22 | 8.216 | (variable) | | |
| 23 | 13.608 | 1.66 | 1.60311 | 60.6 |
| 24 | −28.507 | 0.17 | | |
| 25 | 21.864 | 1.97 | 1.60311 | 60.6 |
| 26 | −13.045 | 0.60 | 1.84666 | 23.9 |
| 27 | 77.145 | (variable) | | |
| 28 | ∞ | 4.20 | 1.51633 | 64.1 |
| 29 | ∞ | | | |
| Image Plane | | | | |

Aspherical Surface Data

Nineteenth Surface $K = -8.31003e-001$
$A3 = 6.71170e-005\ A5 = 1.09709e-005\ A7 = -3.20256e-008$
$A9 = 5.31716e-010$ Twentieth Surface $K = 0.00000e+000$
$A3 = 8.19723e-005\ A5 = 1.95052e-005\ A7 = -3.12293e-007$
$A9 = 2.53983e-009$ Various Data
Zoom ratio 11.53

| | Wide angle end | Intermediate position | Telephoto end |
|---|---|---|---|
| Focal length | 3.65 | 18.93 | 42.02 |
| F-number | 1.65 | 2.68 | 3.00 |
| Angle of view | 39.45 | 9.00 | 4.08 |
| Image height | 3.00 | 3.00 | 3.00 |
| Total lens length | 107.92 | 107.92 | 107.92 |
| BF | 0.50 | 0.50 | 0.50 |
| d11 | 0.70 | 23.34 | 30.49 |
| d17 | 32.31 | 9.67 | 2.52 |
| d22 | 7.81 | 3.64 | 5.24 |
| d27 | 7.43 | 11.60 | 10.00 |

Zoom Lens Unit Data

| Unit | First Surface | Focal length |
|---|---|---|
| 1 | 1 | 37.73 |
| 2 | 12 | −8.92 |
| 3 | 18 | 32.94 |
| 4 | 23 | 15.12 |
| 5 | 28 | ∞ |

Third Numerical Example

Unit mm

Surface Data

| Surface No. | r | d | nd | νd |
|---|---|---|---|---|
| 1 | 76.332 | 1.80 | 1.84666 | 23.9 |
| 2 | 36.157 | 8.51 | | |
| 3 | −121.701 | 3.39 | 1.48749 | 70.2 |
| 4 | −61.069 | 2.39 | | |
| 5 | −38.575 | 1.70 | 1.80610 | 33.3 |
| 6 | −417.343 | 5.90 | 1.77250 | 49.6 |
| 7 | −47.000 | 0.20 | | |
| 8 | 59.328 | 6.28 | 1.60311 | 60.6 |
| 9 | −100.922 | 0.15 | | |
| 10 | 30.748 | 4.08 | 1.60311 | 60.6 |
| 11 | 93.476 | (variable) | | |
| 12 | 65.859 | 0.70 | 1.83481 | 42.7 |
| 13 | 7.655 | 4.50 | | |
| 14 | −25.619 | 0.60 | 1.80400 | 46.6 |
| 15 | 20.380 | 0.42 | | |
| 16 | 15.991 | 2.28 | 1.92286 | 18.9 |
| 17 | 266.780 | (variable) | | |
| 18(Stop) | ∞ | 0.80 | | |
| 19* | 9.028 | 3.72 | 1.58313 | 59.4 |
| 20* | −303.038 | 1.83 | | |
| 21 | 17.693 | 0.70 | 1.83400 | 37.2 |
| 22 | 8.225 | (variable) | | |
| 23 | 12.989 | 3.19 | 1.60311 | 60.6 |
| 24 | −28.300 | 0.15 | | |
| 25 | 22.938 | 2.81 | 1.60311 | 60.6 |
| 26 | −10.452 | 0.60 | 1.84666 | 23.9 |
| 27 | 75.069 | (variable) | | |
| 28 | ∞ | 4.20 | 1.51633 | 64.1 |
| 29 | ∞ | | | |
| Image Plane | | | | |

Aspherical Surface Data

Nineteenth Surface $K = -8.09567e-001$
$A3 = 7.14042e-005$ $A5 = 1.01603e-005$ $A7 = -4.78829e-008$
$A9 = -2.63154e-011$ Twentieth Surface $K = 0.00000e+000$
$A3 = 9.50060e-005$ $A5 = 1.68164e-005$ $A7 = -3.07357e-007$
$A9 = 1.98316e-009$

Various Data
Zoom ratio 14.55

| | Wide angle end | Intermediate position | Telephoto end |
|---|---|---|---|
| Focal length | 3.64 | 21.83 | 53.00 |
| F-number | 1.65 | 2.68 | 3.00 |
| Angle of view | 39.47 | 7.83 | 3.24 |
| Image height | 3.00 | 3.00 | 3.00 |
| Total lens length | 108.40 | 108.40 | 108.40 |
| BF | 0.40 | 0.40 | 0.40 |
| d11 | 0.70 | 23.81 | 31.11 |
| d17 | 32.50 | 9.39 | 2.10 |
| d22 | 7.57 | 3.45 | 8.22 |
| d27 | 6.33 | 10.45 | 5.68 |

Zoom Lens Unit Data

| Unit | First Surface | Focal length |
|---|---|---|
| 1 | 1 | 36.11 |
| 2 | 12 | −8.72 |
| 3 | 18 | 32.61 |
| 4 | 23 | 15.62 |
| 5 | 28 | ∞ |

Fourth Numerical Example

Unit mm

Surface Data

| Surface No. | r | d | nd | νd |
|---|---|---|---|---|
| 1 | 79.163 | 1.80 | 1.84666 | 23.9 |
| 2 | 36.085 | 8.93 | | |
| 3 | −130.078 | 3.05 | 1.48749 | 70.2 |
| 4 | −59.523 | 2.36 | | |
| 5 | −39.084 | 1.70 | 1.80610 | 33.3 |
| 6 | −165.779 | 1.00 | | |
| 7 | −133.101 | 4.29 | 1.77250 | 49.6 |
| 8 | −46.711 | 0.20 | | |
| 9 | 55.726 | 6.14 | 1.60311 | 60.6 |
| 10 | −119.611 | 0.15 | | |
| 11 | 31.791 | 4.14 | 1.60311 | 60.6 |
| 12 | 103.781 | (variable) | | |
| 13 | 51.010 | 0.70 | 1.83481 | 42.7 |
| 14 | 7.589 | 4.55 | | |
| 15 | −26.077 | 0.60 | 1.80400 | 46.6 |
| 16 | 21.153 | 0.59 | | |
| 17 | 16.354 | 2.70 | 1.92286 | 18.9 |
| 18 | 207.300 | (variable) | | |
| 19(Stop) | ∞ | 0.80 | | |
| 20* | 9.088 | 3.81 | 1.58313 | 59.4 |
| 21* | −148.405 | 2.04 | | |
| 22 | 18.997 | 0.70 | 1.83400 | 37.2 |
| 23 | 8.238 | (variable) | | |
| 24 | 13.621 | 1.64 | 1.60311 | 60.6 |
| 25 | −27.967 | 0.18 | | |
| 26 | 21.806 | 2.07 | 1.60311 | 60.6 |
| 27 | −12.812 | 0.60 | 1.84666 | 23.9 |
| 28 | 71.718 | (variable) | | |
| 29 | ∞ | 4.20 | 1.51633 | 64.1 |
| 30 | ∞ | | | |
| Image Plane | | | | |

Aspherical Surface Data

Twentieth Surface $K = -8.37642e-001$
$A3 = 6.94049e-005$ $A5 = 1.07499e-005$ $A7 = -1.69733e-008$
$A9 = 9.18329e-010$ Twenty-first Surface $K = 0.00000e+000$
$A3 = 8.77406e-005$ $A5 = 1.98132e-005$ $A7 = -2.83062e-007$
$A9 = 2.65667e-009$

Various Data
Zoom ratio 11.36

| | Wide angle end | Intermediate position | Telephoto end |
|---|---|---|---|
| Focal length | 3.65 | 18.78 | 41.40 |
| F-number | 1.65 | 2.68 | 3.00 |
| Angle of view | 39.46 | 9.08 | 4.14 |
| Image height | 3.00 | 3.00 | 3.00 |
| Total lens length | 107.65 | 107.65 | 107.65 |
| BF | 0.47 | 0.47 | 0.47 |
| d12 | 0.70 | 23.45 | 30.63 |
| d18 | 32.43 | 9.69 | 2.50 |
| d23 | 7.85 | 3.66 | 5.15 |
| d28 | 7.28 | 11.47 | 9.98 |

-continued

Unit mm

Zoom Lens Unit Data

| Unit | First Surface | Focal length |
|---|---|---|
| 1 | 1 | 37.67 |
| 2 | 13 | −9.01 |
| 3 | 19 | 32.58 |
| 4 | 24 | 15.20 |
| 5 | 29 | ∞ |

TABLE

| | First Example | Second Example | Third Example | Fourth Example |
|---|---|---|---|---|
| Conditional Expression (1) | −2.67 | −1.43 | −1.38 | −1.55 |
| Conditional Expression (2) | 9.46 | 10.35 | 9.91 | 10.33 |
| Conditional Expression (3) | −2.55 | −4.55 | −4.43 | −4.82 |
| Conditional Expression (4) | −2.21 | −2.63 | −2.84 | −2.58 |
| Conditional Expression (5) | −2.81 | −2.45 | −2.39 | −2.47 |
| Conditional Expression (6) | −3.37 | −4.23 | −4.14 | −4.18 |

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2011-023701 filed Feb. 7, 2011, which is hereby incorporated by reference herein in its entirety.

What is claimed is:

1. A zoom lens comprising:
a first lens unit having a positive refractive power;
a second lens unit having a negative refractive power and configured to move during a zooming operation;
a third lens unit having a positive refractive power; and
a fourth lens unit having a positive refractive power and configured to move during a zooming operation,
wherein the first lens unit has a negative lens located closest to an object side, and includes at least five lenses, and
wherein the following conditional expressions are satisfied:

$-5.0<h12w/fw<-1.2$ $9.0<f1/fw<15.0$ $-6.0<f1/f2<-3.0$ where h12w represents a distance between principal points of the first lens unit and the second lens unit at a wide angle end, fw represents a focal length of the entire zoom lens at the wide angle end, and f1 represents a focal length of the first lens unit, and f2 represents a focal length of the second lens unit.

2. The zoom lens according to claim 1, wherein the first lens unit includes at least two negative lenses.

3. The zoom lens according to claim 1, wherein the following conditional expression is satisfied:

$-8.0<(R31+R22)/(R31-R22)<-1.0$ where R22 represents a radius of curvature of an image-side lens surface of a second lens that is in a second lens position in the first lens unit from the object side, and R31 represents a radius of curvature of an object-side lens surface of a third lens that is in a third lens position in the first lens unit from the object side.

4. The zoom lens according to claim 1,
wherein the first lens unit includes a front lens group having, in order from the object side to the image side, a negative lens, a positive lens, a negative lens, and a positive lens, and a rear lens group having two positive lenses, and
wherein the following conditional expression is satisfied:

$-5.0<ff/fr<-1.0$ where ff represents a focal length of the front lens group, and fr represents a focal length of the rear lens group.

5. The zoom lens according to claim 4,
wherein the front lens group includes, in order from the object side to the image side, a negative meniscus lens having a convex lens surface on the object side, a positive lens having a convex lens surface on the image side, a negative lens having a concave lens surface on the object side, and a positive lens having a convex lens surface on the image side, and
wherein the rear lens group includes, in order from the object side to the image side, a positive lens having both convex lens surfaces and a positive lens having a convex lens surface on the object side.

6. The zoom lens according to claim 1, wherein the following conditional expression is satisfied:

$-4.0<f2/fw<-1.5.$

7. An image pickup apparatus comprising:
a zoom lens; and
an image pickup element configured to receive an optical image formed by the zoom lens,
wherein the zoom lens comprises:
a first lens unit having a positive refractive power;
a second lens unit having a negative refractive power and configured to move during a zooming operation;
a third lens unit having a positive refractive power; and
a fourth lens unit having a positive refractive power and configured to move during a zooming operation,
wherein the first lens unit has a negative lens located closest to an object side, and includes at least five lenses, and
wherein the following conditional expressions are satisfied:

$-5.0<h12w/fw<-1.2$ $9.0<f1/fw<15.0$ $-6.0<f1/f2<-3.0$ where h12w represents a distance between principal points of the first lens unit and the second lens unit at a wide angle end, fw represents a focal length of the entire zoom lens at the wide angle end, f1 represents a focal length of the first lens unit, and f2 represents a focal length of the second lens unit.

8. The image pickup apparatus according to claim 7, further comprising:
a correction unit configured to correct distortion caused in the zoom lens by an electrical method.

9. A zoom lens comprising:
a first lens unit having a positive refractive power;
a second lens unit having a negative refractive power and configured to move during a zooming operation;

a third lens unit having a positive refractive power; and
a fourth lens unit having a positive refractive power and configured to move during a zooming operation,
wherein the first lens unit has a negative lens located closest to an object side, and includes at least five lenses,
wherein the first lens unit includes a front lens group having, in order from the object side to the image side, a negative lens, a positive lens, a negative lens, and a positive lens, and a rear lens group having two positive lenses, and
wherein the following conditional expressions are satisfied:

$-5.0 < h12w/fw < -1.2$ $9.0 < f1/fw < 15.0$ $-5.0 < ff/fr < -1.0$ where $h12w$ represents a distance between principal points of the first lens unit and the second lens unit at a wide angle end, fw represents a focal length of the entire zoom lens at the wide angle end, f1 represents a focal length of the first lens unit, ff represents a focal length of the front lens group, and fr represents a focal length of the rear lens group.

10. An image pickup apparatus comprising:
a zoom lens; and
an image pickup element configured to receive an optical image formed by the zoom lens,
wherein the zoom lens comprises:
a first lens unit having a positive refractive power;
a second lens unit having a negative refractive power and configured to move during a zooming operation;
a third lens unit having a positive refractive power; and
a fourth lens unit having a positive refractive power and configured to move during a zooming operation,
wherein the first lens unit has a negative lens located closest to an object side, and includes at least five lenses,
wherein the first lens unit includes a front lens group having, in order from the object side to the image side, a negative lens, a positive lens, a negative lens, and a positive lens, and a rear lens group having two positive lenses, and
wherein the following conditional expressions are satisfied:

$-5.0 < h12w/fw < -1.2$ $9.0 < f1/fw < 15.0$ $-5.0 < ff/fr < -1.0$ where $h12w$ represents a distance between principal points of the first lens unit and the second lens unit at a wide angle end, fw represents a focal length of the entire zoom lens at the wide angle end, f1 represents a focal length of the first lens unit, ff represents a focal length of the front lens group, and fr represents a focal length of the rear lens group.

* * * * *